C. SCHENK.
CAKE MIXER.
APPLICATION FILED MAY 11, 1910.
1,004,821.
Patented Oct. 3, 1911.
2 SHEETS—SHEET 2.
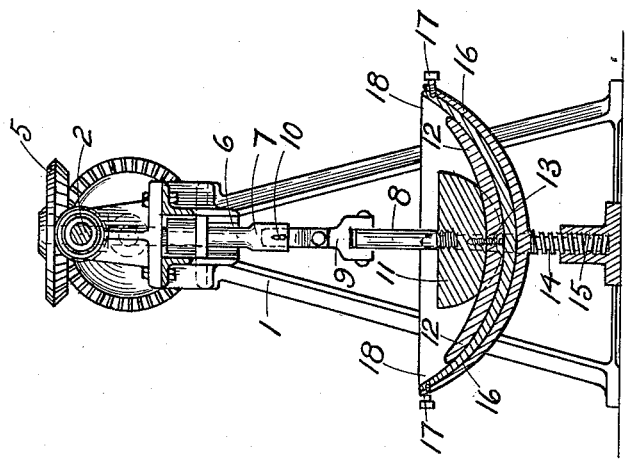
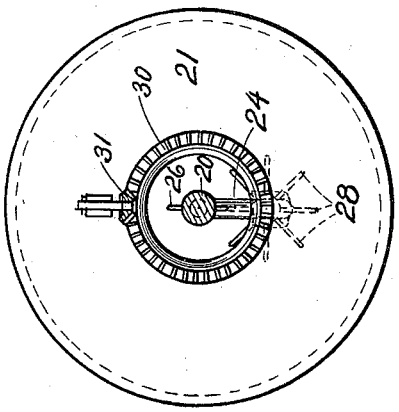
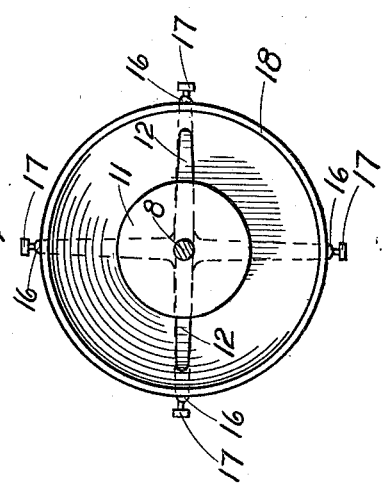
Witnesses
H. J. Hansen
B. G. Richards
Inventor
Charles Schenk
By Joshua R. Potts
his Attorney

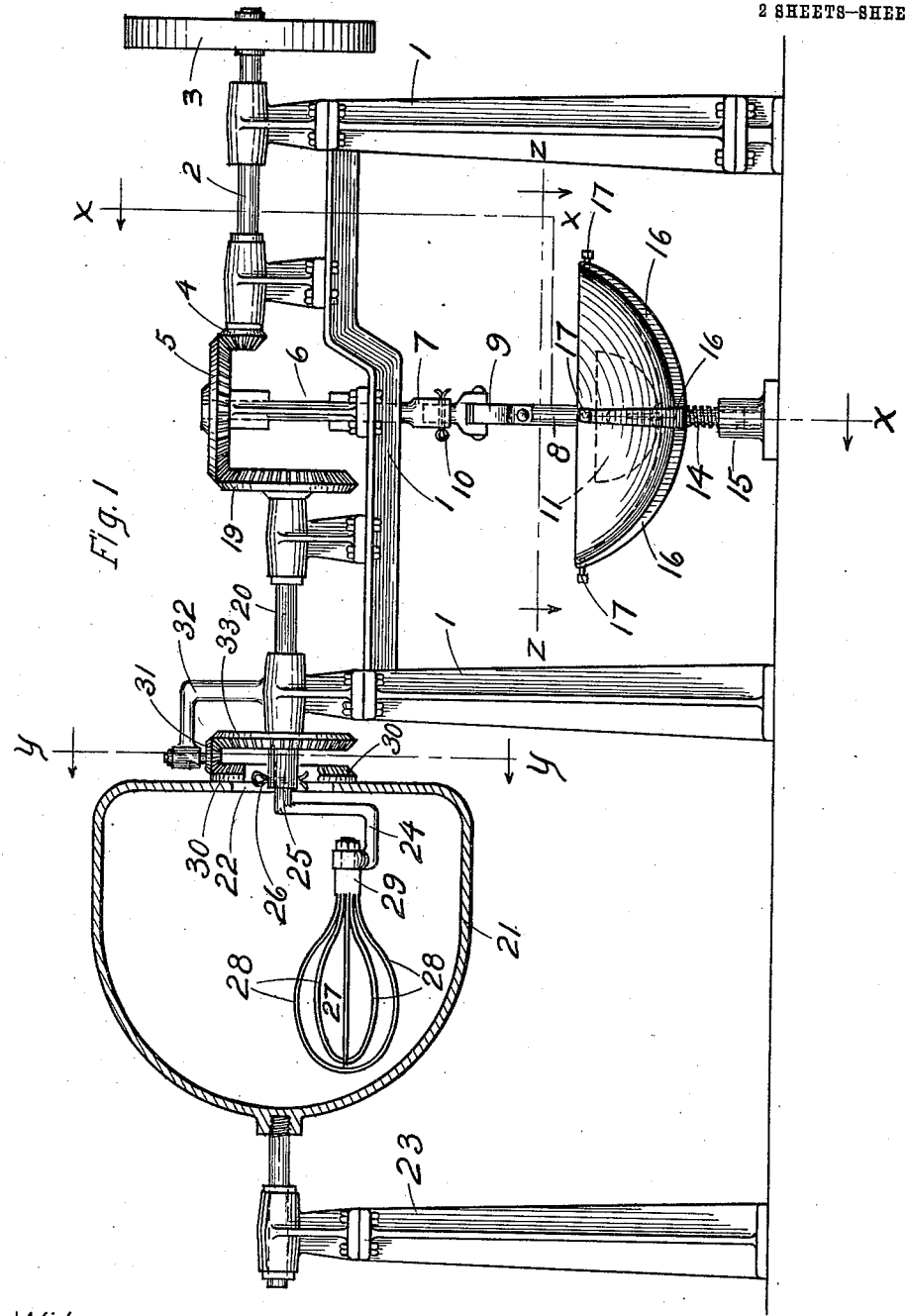

UNITED STATES PATENT OFFICE.

CHARLES SCHENK, OF CHICAGO, ILLINOIS.

CAKE-MIXER.

1,004,821. Specification of Letters Patent. Patented Oct. 3, 1911.

Application filed May 11, 1910. Serial No. 560,632.

*To all whom it may concern:*

Be it known that I, CHARLES SCHENK, a citizen of the United States, residing at Chicago, county of Cook, and State of Illinois, have invented certain new and useful Improvements in Cake-Mixers, of which the following is a specification.

My invention relates to improvements in cake mixers and has for its object the production of an improved cake mixer which is of simple construction and efficient in operation.

The invention consists in the combination and arrangement of parts hereinafter described and claimed.

The invention will be best understood by reference to the accompanying drawings forming a part of this specification, and in which, Figure 1 is a sectional elevation of a machine embodying my invention, Fig. 2 is a section on line $x$—$x$ of Fig. 1, Fig. 3 is a section on line $y$—$y$, and Fig. 4 is a section on line $z$—$z$ of Fig. 1.

The preferred form of construction as illustrated in the drawings comprises a suitable frame or table 1 upon which is mounted a horizontal driving shaft 2 having a driving pulley 3 at one end by means of which said horizontal shaft may be driven by a belt from a motor or other suitable source of power. At its inner end shaft 2 carries a bevel gear 4 meshing with a bevel gear 5 carried by a vertical shaft 6 mounted in table 1. At its lower end shaft 6 carries a socket 7 adapted to receive the upper end of a shaft 8 having a universal joint 9 therein. Shaft 8 is removably secured in position in socket 7 by means of a cotter pin 10 passing through suitable holes in said shaft and socket. At its lower end shaft 8 carries a semi-spherical ball 11 which carries a bow-shaped stirrer arm 12 let into a suitable notch in the lower face of said ball and secured in position by means of a screw 13. Below the lower end of shaft 8 is mounted a vertically adjustable standard comprising a screw shaft 14 threaded into a bearing block 15 and carrying upwardly extending divergent arms 16 provided with set-screws 17 at their upper ends. A mixing bowl 18 is removably secured in arm 16 by means of set-screws 17 in position to encompass ball 11 and stirrer arm 12. By this construction it will be observed that the ball 11 in stirrer arm 12 will be constantly rotated in bowl 18 while free to assume different angular positions to adjust themselves to the bowl or to the conditions of dough therein, and that a bowl 18 may be readily adjusted to and away from said ball and arm.

Meshing with the bevel gear 5 is a bevel gear 19 carried by a horizontal spindle 20 and also suitably mounted on table 1. A mixing bowl 21 having a central side aperture 22 registering with spindle 20 is rotatably mounted in a suitable standard 23 arranged at a short distance from corresponding end of table 1. Spindle 20 carries a crank arm 24 removably secured in a socket 25 by means of a cotter pin 26 passing through suitable holes in said socket and shaft. At its free end crank arm 24 carries a stirrer 27 consisting of a series of wire loops 28 secured in a socket member 29 which in turn is removably secured to the end of said crank arm. Bowl 21 carries a bevel gear 30 surrounding the end of spindle 20 and meshing with the bevel gear 31 carried by a standard 32 and in turn meshing with a bevel gear 33 on spindle 20. By this construction it will be observed that bowl 21 and stirrer 27 will be constantly rotated and revolved in opposite directions.

In use, dough for pound cake, etc., is mixed in bowl 18 and dough for lighter cake, such as angel food, is mixed in bowl 21, and both will be found to be highly efficient in such uses. If desired, bowl 21 and crank arm 24 may be removed and different implements, such as a grater, apple parer, etc. may be secured in socket 25 and used with great convenience.

While I have illustrated and described the preferred form of construction for carrying my invention into effect, this is capable of variation or modification without departing from the spirit of the invention comprehended within the scope of the appended claims.

Having described my invention what I claim as new and desire to secure by Letters Patent is:

1. A dough stirrer comprising a vertical shaft having a universal joint therein; a substantially semi-spherical ball at the lower end of said shaft; a bow shaped stirrer arm secured across the lower face of said ball; a bowl arranged to encompass said ball and arm; and means for rotating said shaft, substantially as described.

2. A dough stirrer comprising a vertical shaft having a universal joint therein; a substantially semi-spherical ball at the lower end of said shaft; a bow-shaped stirrer arm secured across the lower face of said ball; a vertically adjustable standard below said shaft, said standard comprising four upwardly extending divergent arms; set screws at the upper ends of said arms; a bowl mounted in said standard and arranged to encompass said ball and arm; and means for rotating said shaft, substantially as described.

In testimony whereof I have signed my name to this specification in the presence of two subscribing witnesses.

CHARLES SCHENK.

Witnesses:
HELEN F. LILLIS,
JOSHUA R. H. POTTS.